United States Patent
Seubert et al.

(10) Patent No.: US 12,291,618 B2
(45) Date of Patent: May 6, 2025

(54) METHOD FOR PRODUCING A HYDROPHILIC SURFACE ON PS/DVB COPOLYMER PARTICLES

(71) Applicant: METROHM AG, Herisau (CH)

(72) Inventors: Andreas Seubert, Marburg (DE); Jonathan Sebastian Tripp, Marburg (DE); Rudolf Aeschlimann, Urnäsch (CH); Michael Ott, Thalheim an der Thur (CH); Bastian Brand, Siebnen (CH)

(73) Assignee: Metrohm AG, Herisau (CH)

( * ) Notice: Subject to any disclaimer, the term of this patent is extended or adjusted under 35 U.S.C. 154(b) by 819 days.

(21) Appl. No.: 17/601,766

(22) PCT Filed: Apr. 7, 2020

(86) PCT No.: PCT/EP2020/059908
§ 371 (c)(1),
(2) Date: Oct. 6, 2021

(87) PCT Pub. No.: WO2020/208026
PCT Pub. Date: Oct. 15, 2020

(65) Prior Publication Data
US 2022/0204712 A1    Jun. 30, 2022

(30) Foreign Application Priority Data
Apr. 10, 2019  (EP) .................................... 19168303

(51) Int. Cl.
*C08J 7/056*   (2020.01)
*B01D 15/36*   (2006.01)
(Continued)

(52) U.S. Cl.
CPC ............ *C08J 7/056* (2020.01); *B01D 15/361* (2013.01); *B01J 39/20* (2013.01); *B01J 39/26* (2013.01);
(Continued)

(58) Field of Classification Search
CPC ... B01J 39/26; B01J 39/20; B01J 41/14; B01J 41/20; B01J 41/00; C08J 2325/08; C08J 7/056
See application file for complete search history.

(56) References Cited

U.S. PATENT DOCUMENTS

| 5,030,352 A |   | 7/1991 | Varady et al. |
| 5,503,933 A | * | 4/1996 | Afeyan .................. B01J 20/261 428/407 |

(Continued)

FOREIGN PATENT DOCUMENTS

| EP | 1 217 012 A1 | 6/2002 |
| EP | 3 248 678 A1 | 11/2017 |

(Continued)

OTHER PUBLICATIONS

Liu et al. Material Letters (2013) 177-180 (Year: 2013).*
(Continued)

*Primary Examiner* — Mark S Kaucher
(74) *Attorney, Agent, or Firm* — Finch & Maloney PLLC

(57) ABSTRACT

A method for modifying a polymer carrier material for use as a stationary phase in an analytical or preparative separating method, the method comprising the steps of: providing a polymer carrier material, which is at least partly formed of aromatic hydrocarbon compounds comprising at least two vinyl or allyl substituents; producing hydroxy groups on/in the polymer carrier material by a method comprising an oxidative treatment of the polymer carrier material and a subsequent reductive or hydrolytic treatment
(Continued)

of the reaction product; reacting the product from the previous step with a polyfunctional compound. The invention also relates to a polymer carrier material for use as a stationary phase in an analytical or preparative separating method, in particular a chromatography method, produced according to a method according to the invention.

10 Claims, 6 Drawing Sheets

(51) Int. Cl.
    *B01J 39/20* (2006.01)
    *B01J 39/26* (2006.01)
    *B01J 41/14* (2006.01)
    *B01J 41/20* (2006.01)
    *B01J 47/02* (2017.01)
    *C08J 7/12* (2006.01)

(52) U.S. Cl.
    CPC .............. *B01J 41/14* (2013.01); *B01J 41/20* (2013.01); *B01J 47/02* (2013.01); *C08J 7/12* (2013.01); *C08J 2325/08* (2013.01)

(56) References Cited

U.S. PATENT DOCUMENTS

2005/0181224 A1  8/2005  Pohl et al.
2009/0042307 A1  2/2009  Yotani et al.

FOREIGN PATENT DOCUMENTS

| JP | S52-06386 A | 1/1977 |
| JP | H04-505968 A | 10/1992 |
| JP | H06-023280 A | 2/1994 |

OTHER PUBLICATIONS

A. Peristyy et al., "Diamond Based Adsorbents and Their Application in Chromatography", Journal of Chromatography A, 1357, (2014), 68-86.

P. Nesterenko et al, "Ion Chromatographic Investigation of the Ion-Exchange Properties of Microdisperse Sintered Nanodiamonds", Science Direct, Journal of Chromatography A, 1155, (Nov. 2, 2007), 2-7.

A. Krueger et al, "Functionality is Key: Recent Progress in the Surface Modification of Nanodiamond", Advanced Functional Materials, Jan. 1, 2012, 22, 890-906.

A. Koreshkova et al, "Recent Advances and Applications of Synthetic Diamonds in Solid-Phase Extraction and High-Performance Liquid Chromatography", Journal of Chromatography A, 1640, (Jan. 23, 2021) 461936.

N. Fontanals et al., "New material in sorptive extraction techniques for polar compounds", Journal of Chromatography A, 1152, Dec. 20, 2006, pp. 14-31 See Russian Action.

Russian Office Action Corresponding to 2021132467 mailed Jun. 8, 2023.

Japanese Office Action Corresponding to 2021-559918 mailed Jan. 30, 2024.

Caglayan et al., Monodisperse porous poly(vinyl acetate-co-divinylbenzene) particles by single-stage seeded polymerization: A packing material for reversed phase HPLC:, Journal of Separation of Science, May 2, 2006, vol. 27, Issue 7, See Spc., pp. 3 and 10.

International Search Report Corresponding to PCT/EP2020/059908 Mailed Jun. 17, 2020.

Written Opinion Corresponding to PCT/EP2020/059908 Mailed Jun. 17, 2020.

European Search Report Corresponding to 19168303.5 mailed Oct. 8, 2019.

\* cited by examiner

METHOD FOR PRODUCING A HYDROPHILIC SURFACE ON PS/DVB COPOLYMER PARTICLES

This application is a National Stage completion of PCT/EP2020/059908 filed Apr. 7, 2020, which claims priority from European patent application serial no. 19168303.6 filed Apr. 10, 2019.

FIELD OF THE INVENTION

The present invention relates to a process for modifying a polymer support material for use as a stationary phase in an analytical or preparative separation process, the process comprising the steps of: providing a polymer support material at least partially formed from aromatic hydrocarbon compounds having at least two vinyl or allyl substituents; generating hydroxy groups on/in the polymer support material by a process comprising an oxidative treatment of the polymer support material and a subsequent reductive or hydrolytic treatment of the reaction product; reacting the product of the previous step with a polyfunctional compound. The invention further relates to a polymer support material for use as a stationary phase in an analytical or preparative separation process, in particular a chromatographic process, prepared by a process according to the invention.

BACKGROUND OF THE INVENTION

Ion exchangers are usually composed of particulate materials that carry charges on their surface that enable them to retain ions. In the case of anion exchangers, these are often cationic ammonium compounds, although phosphonium and arsonium ions are also known. The exchanger group is monocationic. In purely electrostatic interactions, the retention time is determined by Coulomb's law. According to this, only the charge of the retarded anion should affect the retention time of the same.

However, in ion chromatography in aqueous solution, other factors can be identified that affect retention behavior, such as the hydration of the anion and the hydration of the exchanger group. Furthermore, the polarizability of the ions involved and weaker, secondary interactions between the analytes and the exchanger substrate also play a role. Since the hydrophilicity of the base polymer, which carries the exchanger group, also affects the hydration of the same, the retention behavior of the ion exchanger can be changed by modifying the carrier material for the same exchanger group. The direct substituents of the cationic group also have an influence on the retention behavior.

The state of the art already includes approaches for adjusting the hydrophilicity of a particle for ion exchange chromatography. Other desirable parameters such as balanced capacity, high theoretical plate number or chemical inertness of the ion exchange material are also discussed selectively.

In US20050181224, cross-linking layers containing the exchange groups are deposited on a sulfonated hydrophilic carrier particle by cyclic reaction of diepoxides and amines. With each cycle, the capacity of the ion exchanger increases. Hydrophilicity is basically guaranteed. However, due to the alternating epoxy/amine chemistry, additional hydrophilicity cannot be obtained independently of the capacity.

In EP 3248678, a porous divinylbenzene particle is coated with modified polysaccharides (agarose reacted with glycidyl phenyl ether) and the modified polysaccharide is then crosslinked with a polyfunctional crosslinking agent (e.g. ethylene glycol diglycidyl ether) to form a macromolecule having hydroxyl groups on the surface. Thereafter, the substrate is set with diethylaminoethyl chloride hydrochloride to obtain the actual ion exchange group. The application also seeks a hydrophilic ion exchange particle with increased stability (rupture strength). Due to the pure adsorption forces acting between the particle and the initially gel-like coating, the substrate also proves to be less stable.

EP1217012 starts from a hydrophobic vinyl alcohol ester polymer. First, the esters contained are hydrolyzed so that alcohol groups are released. The polymer becomes hydrophilic. The OH groups are reacted with a diepoxide and then an amine to coat the substrate. The hydrophilicity could be further increased by subjecting the base polymer to more extensive hydrolysis in the first step. However, this would result in a loss of mechanical stability of the particle. Undesirable swelling behavior may occur.

In a publication by Çaglayan et al (J Sep Sci 2006, 29. 940), an attempt is made to optimize some of the parameters mentioned, such as theoretical soil number, pore size and surface expansion, by using a particle substrate of poly(vinyl acetate-co-divinylbenzene) of different composition. According to the printed paper, an increased amount of vinyl acetate—and thus an increased amount of OH groups in the hydrolyzed particle—results in sharply increasing reflux pressure when the column packed with the substrate is subjected to an increased flow rate. This undesirable return pressure is attributed to the lack of mechanical stability of the particles, which deform during the separation process.

U.S. Pat. No. 5,503,933 discloses hydrophilic coatings covalently bonded to hydrophobic surfaces and methods for their preparation. A compound comprising a hydrophobic domain including an unsaturated group and a hydrophilic domain is provided to form the coated surfaces. A hydrophobic surface having unsaturated groups is also provided. The molecules of the compound are adsorbed onto the hydrophobic surface, and the unsaturated groups in the hydrophobic domains of the molecules of the compound are then covalently bonded to the unsaturated groups on the hydrophobic surface by a free radical reaction. In one embodiment, hydrophilic coatings may be covalently bonded to divinylbenzene-crosslinked polystyrene. However, the resulting particles are only suitable for the separation of macromolecules. For use in other chromatographic techniques, particularly ion chromatography, the particles have an unsatisfactory theoretical plate number due to their large diameter. With reduced particle size, in turn, the mechanical load-bearing capacity of the macroporous material would not be sufficient for the pressures generated in such chromatography processes.

SUMMARY OF THE INVENTION

It is the object of the present invention to overcome the above disadvantages in the prior art. There is currently a lack of a method according to which a polymer substrate can be coated in such a way that the hydrophilicity of the polymer substrate surface can be adjusted independently of the oxygen content in the polymer core substrate and a mechanically stable and robust particle results. At the same time, an ion exchange substrate based thereon should be chemically largely inert and it should be possible to configure hydrophilicity and capacity or selectivity and capacity independently of one another.

This task is solved by a process which has the features of the independent claim(s). It relates to a process for modifying a polymer support material for use as a stationary phase in an analytical or preparative separation process. The invention further relates to a polymer support material for use as a stationary phase in an analytical or preparative separation process, in particular a chromatography process, prepared according to a process according to the invention. The invention relates to a chromatography column filled with the polymer support material according to the invention, to a method for separating analytes using the polymer support material according to the invention, and to the use of polymer support material according to the invention for the analytical and preparative separation of analytes.

The method comprises the steps of: providing a polymeric support material at least partially formed from aromatic hydrocarbon compounds having at least two vinyl or allyl substituents, preferably at least partially formed from divinylbenzene monomers (step a); generating hydroxy groups on/in the polymeric support material by a process comprising the steps of: oxidatively treating the polymeric support material (step b.1); subsequent reductive or hydrolytic treatment of the reaction product of step b.1 (step b.2); optionally: reaction of the product of step b.2. with a polyfunctional compound, in particular a compound having at least one first functional group reactive with hydroxy groups, preferably a halogen group, and at least one second functional group reactive with amines and/or hydroxy groups, preferably an epoxide group (step c).

It goes without saying that a functional group reactive with amines is or may be simultaneously reactive with other organoelement compounds of the 5th main group, namely with arsines or phosphines.

As will be further explained below, in particular with respect to the process according to the invention, the steps according to the invention have an effect on the oxygen content at the polymer support material surface. The hydrophilicity of the polymer support material surface is thus independent of the oxygen content in the polymer support core substrate.

The polymer carrier material provided in step a. is typically provided as a particle, preferably as a spherical particle, particularly preferably as a spherical particle with an average particle size (median) of 1 to 50 µm, even more preferably with an average particle size of 2 to 25 µm, particularly preferably with an average particle size of 3 to 9 µm. However, other polymer support materials are also conceivable, in particular polymer support materials in the form of membranes or monoliths.

The oxygen content on the surface of the polymer support material is increased by the initial oxidation and reduction or hydrolysis. The modification can also originate oxygen atoms on/in a core polymer support material that has no detectable oxygen content. The increased oxygen content influences the nature and expression of secondary interactions, particularly the hydrophilicity of the resulting polymer support material. Moreover, through a series of steps following the initial oxidation and reduction/hydrolysis, the capacity can be adjusted independently of the oxygen content at the surface.

By surface of the polymer carrier material or polymer carrier material surface is meant here in particular the solution-contactable outer surface of the polymer carrier material structure as well as the layer of 1 to 30 nm immediately adjacent to this outer surface, wherein the solution-contactable outer surface may be partially located on microstructures of, for example, porous structures. In particular, the solution-contactable outer surface of polymer carrier material particles of porous or non-porous structure is meant.

An initial contribution to chemical and mechanical stability is made by the covalent bond between the polymer carrier material and the coating. This contrasts with the situation with latex-based ion exchangers, where purely electrostatic interactions hold the latex grains, and thus the exchanger groups, to the substrate. High chemical inertness is also ensured due to the covalent bond. A second contribution to mechanical stability is made by the fact that the core polymer support material is formed at least in part from aromatic hydrocarbon compounds having at least two vinyl or allyl substituents, preferably at least in part from divinylbenzene monomers. The stability of this core polymer support material is not affected by steps b.1 and b.2. The core polymer support material is preferably monodisperse.

Step c, i.e. the reaction of the product of step b.2. with a polyfunctional compound, in particular a compound having at least one first functional group reactive with hydroxy groups and at least one second functional group reactive with amines and/or hydroxy groups, is optional. If the step is omitted, the particle is suitable for use in, for example, size exclusion chromatography.

In particular, the preparation of ion exchange material for use in anion exchange chromatography or cation exchange chromatography based on the polymer support material modified according to the invention is described below. However, the use of the particles is by no means limited thereto. The particles can also be used in other analytical and preparative separation methods, such as other adsorption chromatography methods, HILIC chromatography (hydrophilic interaction liquid chromatography), reversed phase chromatography, solid phase extraction, etc.

In a preferred embodiment, the method comprises steps a, b and c as described above, and further steps following step c, namely performing a number of coating cycles (step d). A single coating cycle, step d, comprises: Introducing or generating hydroxy groups by reacting the second functional group reactive with amines and/or hydroxy groups, preferably the epoxide group introduced in step c, with a polyfunctional compound having hydroxy groups, in particular with a polyol, or by hydrolysis or a combination thereof (step d.1); and reacting the product of step d.1. with a polyfunctional compound, in particular a compound having at least a first functional group reactive with hydroxy groups, preferably a halogen group, and at least a second functional group reactive with amines and/or hydroxy groups, preferably an epoxide group (step d.2). The number of coating cycles is between 0 and 20.

If the number of coating cycles is at least 2, the introduction or generation of hydroxyl groups from the first repetition onwards obviously no longer concerns, or at least no longer exclusively concerns, functional groups introduced in step c, but mainly concerns corresponding functional groups introduced in step d.2. This is particularly true if the conditions are chosen such that the second functional groups from step c react substantially completely when the first coating cycle is carried out in step d.1.

By increasing the number of coating cycles, the oxygen content at the surface of the polymer support material can be further increased, and the hydrophilicity of an ion exchange material based on the polymer support material can be increased. By selecting an appropriate degree of hydrophilicity, the interactions of the ion exchange material with highly hydrated ions (such as fluoride) can be enhanced and the interactions with ions that are too weakly hydrated (such as bromate, nitrate, chlorate) can be reduced. In this way, for example, the retention order of bromate and chloride can be influenced so that bromate comes quantifiably before chloride in the chromatogram. Furthermore, it can be ensured that fluoride has a separation from the injection peak, in particular also when a carbonate eluent is used.

Further, by the method according to the invention, an ion exchange material with plate numbers of >50,000 TP/m theoretical plates per column meter can be obtained for the seven standard anions (fluoride, chloride, nitrite, bromide, nitrate, phosphate and sulfate) with high signal symmetries (asymmetry <1.5). All the above ions appear baseline separated from each other in the chromatogram with overall short total chromatography time.

The advantages of the high robustness of the particles are particularly evident when a column packed with a polymer support material obtained by the above method is subjected to a pressure flow test. In such a stress test, the pressure development in the column is determined as a function of a continuously increased flow rate. In the column according to the invention, the pressure depends linearly on the flow rate. This is in contrast to results obtained with conventional columns packed with hydrophilic pDVB substrate having a high vinyl acetate content. With conventional columns, the pressure increases more than linearly as a function of flow rate. For example, a hyperbolic slope of the function may result. This results, for example, from the publication by Çaglayan et al. cited at the beginning (J Sep Sci 2006, 29, 940).

The performance of the column according to the invention after performing a pressure test is also better compared to conventional columns. On the one hand, the column exhibits only a small increase in the pressure drop across the column after performing the stress test compared to conventional columns. In addition, the number of theoretical bottoms decreases in the course of a load test on the column according to the invention to a much lesser extent than is the case with conventional columns (Çaglayan et al., J Sep Sci 2006, 29, 940). Maintaining pressure ratios and plate numbers even when high flow rates are used enables efficient high performance separation processes.

The method may then additionally comprise step e, introducing ion exchange groups on the reaction product of step c or d.2. By step e, an ion exchange material which realizes the advantages associated with the polymeric support material is produced from the polymeric support material. Hydrophilicity and capacity or selectivity and capacity are independently adjustable in this ion exchange material according to the invention. The ion exchange material according to the invention also has a high number of theoretical soils.

Ion exchange groups are understood to be charged groups on the polymer support material surface, in particular charged amine, arsine or phosphine groups.

By polymer support material which is at least partially formed from aromatic hydrocarbon compounds having at least two vinyl or allyl substituents, it is understood in the context of the present invention that the polymer support material is preparable by a polymerization reaction involving at least aromatic hydrocarbon compounds having at least two vinyl or allyl substituents. Preferably, the polymer support material is formed by polymerization reactions with divinylbenzene. However, reactions with trivinylbenzene and divinylnaphthalene and compounds known to the skilled person as equivalent are also conceivable.

The process may be characterized in that the polymeric carrier material in step a, which is at least partially formed from aromatic hydrocarbon compounds having at least two vinyl or allyl substituents, is additionally partially formed from monomers selected from the group consisting of ethylvinylbenzene, vinyl acetate, styrene, and a combination thereof. In this regard, the proportion of aromatic hydrocarbon compounds having at least two vinyl or allyl substituents is preferably at least 50% by weight. For example, the polymer support material in step a may comprise at least 50% by weight of divinylbenzene units. Such a polymer support material has advantageous properties with respect to the pore structure and in particular has a high number of available double bonds for subsequent surface modification.

The process may be characterized in that the oxidative treatment in step b.1 is a treatment with a peracid, preferably selected from the group consisting of meta-chloroper-benzoic acid (m-CPBA), peroxyformic acid, peroxyacetic acid, peroxytrifluoroacetic acid, a treatment with $KMnO_4$, a treatment with oxygen plasma, or a combination thereof. Exposure of the polymer to a peracid oxidizes any double bonds present and renders them accessible to subsequent reduction or hydrolysis. It goes without saying that the effect can in principle also be achieved by other oxidative processes known to the skilled person, for example by ozonolysis.

It is particularly preferred if a peracid is used in step b.1. The advantage of peracids is that higher oxygen contents can be achieved than with plasma treatment, for example. Oxygen contents of 2.0% can be achieved with oxygen plasma, whereas oxygen contents of 3.2%, measurable by elemental analysis, can be achieved with mCPBA, for example. If a peracid is used, it can be added to the polymer in suspension or formed in situ from an acid and hydrogen peroxide. Preferably, m-CPBA is added to the suspended core polymer support material, e.g. PS/DVB polymer support material, as this is uncomplicated to handle as a solid.

In a preferred embodiment, the reductive treatment of the reaction product from oxidation step b.1 is carried out in step b.2 with a reagent for reducing polar bonds, preferably with a metal hydride. This may be, for example, $NaBH_4$, $BH_3$, LAH, NaH, CaH. The use of hydrides has the advantage that the dissolved reagent can penetrate into the pores of the particle. This is not possible, for example, with palladium on activated carbon. Compared to hydrolysis with hydrochloric acid, which can convert epoxides to hydroxylene (see Example 3), reduction with metal hydrides can also convert carbonyls and carboxyls to hydroxylene. The reduction converts the oxidation products formed to alcohols. Preferably, lithium aluminum hydride in diethyl ether is used. In one embodiment, a 1-20% w/v polymer suspension in dry diethyl ether is presented to which 5-100% w/w of the polymer dry weight of lithium aluminum hydride is added. Particularly preferred is a 5-15% w/v polymer suspension in dry diethyl ether to which is added 5-20% w/w of the polymer dry weight of lithium aluminum hydride. A temperature of 25-70° C. may be selected, particularly preferably the boiling temperature of diethyl ether, and a reaction time of from 1 min to 72 h, particularly preferably from 3 h to 48 h.

The OH groups generated on the polymer support surface by the process described above are now available in sufficient numbers for the modification in step c. As an alternative to reductive conditions, hydrolytic conditions can also be selected.

The reaction product of step b.2 is reacted with a polyfunctional compound, in particular with a compound having at least one first functional group reactive with hydroxy groups, preferably a halogen group, and at least one second functional group reactive with amines and/or hydroxy groups, preferably an epoxide group.

The first functional group reactive with hydroxy groups may be a structure nucleophilically attackable by OH groups or amine groups, such as a halocarbon, an epoxide, a tosylate, a methyl sulfide, or a mixture thereof. The second functional group reactive with amines and/or hydroxy groups may be, for example, an epoxide. Preferably, the polyfunctional compound in step c is epichlorohydrin (ECH). For example, the substrate may be suspended in epichlorohydrin (preferably 5-30% w/v solids in ECH, more preferably 10-20% w/v solids in ECH). It can then be reacted with a base, such as aqueous alkali and alkaline earth metal hydroxide. For this purpose, aqueous solutions of NaOH and KOH, particularly preferably 10-50% w/w NaOH in the ratio ECH:NaOH(aq)=1:(0.1-10) have proven suitable. Particularly preferably, the reaction is carried out using a quaternary ammonium salt as a phase transfer catalyst. Alternatively, the substrate suspended in ECH can be reacted with a quaternary ammonium hydroxide. Tetramethylammonium hydroxide has been found suitable for this purpose. Preferably, the same amount of dimethyl sulfoxide (DMSO) as ECH is added to the suspension of polymer in ECH prepared as above, and preferably between 1 and 10 mmol of tetramethylammonium hydroxide in concentrated aqueous solution is added per gram of polymer used, more preferably between 2 and 5 mmol of tetramethylammonium hydroxide (aq).

However, the polyfunctional compound used in step c comprising at least one first functional group reactive with hydroxy groups and at least one second functional group reactive with amines and/or hydroxy groups may also be a spacer molecule.

In the context of this application, a spacer molecule (spacer for short) means a molecule having the above-mentioned at least two functional groups, the molecule ensuring a spacing of at least 3 atoms, preferably from 3 to 20 atoms, between the modified polymer carrier material surface and ion exchange groups to be introduced. The spacer molecule binds in the finished ion exchange material on the one hand to the modified polymer support material and on the other hand to the exchanger group. The functional groups of the spacer molecule may be structures that can be nucleophilically attacked by OH groups or amine groups, such as halohydrocarbons, epoxides, tosylates, methyl sulfides, or a mixture thereof. The spacer atoms may be carbon chains but may also include heteroatoms, for example ether groups or thioethers. The spacer molecule provides a spacing between the substrate and the ion exchange group. The function of the spacer is to prevent the ions from interacting with the substrate. This counteracts unwanted peak broadening in the chromatogram. Spaced carbon chains with ether groups are preferred due to their higher hydrophilicity. Particularly preferably, the spacer has glycidyl groups which can react with amines, phosphines, arsines and/or hydroxy groups. Particularly preferred is the spacer molecule 1,4-butanediol diglycidyl ether.

When in step d.1 hydroxy groups are introduced by reaction of the second functional group introduced in step c (or optionally in step d.2) by reaction with polyfunctional compounds comprising hydroxy groups, the use of a diol is preferred. Butanediol is particularly preferred. The diol can be used as solvent and reactant and the reaction can take place under base catalysis at elevated temperature. Particularly preferred is 0.1-1 mol/L KOH at 60-160° C. for 1-48 h. Most preferably, the temperature is 100-130° C. and the reaction time is 3-36 h. By the addition of such a compound, epoxides previously bound to the substrate are converted into chains containing OH groups.

In one embodiment, the polyfunctional compound used in step d.2 having at least one first functional group reactive with hydroxy groups and at least one second functional group reactive with amines and/or hydroxy groups is an epihalohydrin, preferably epichlorohydrin. In this regard, the carrier polymer particle may first be suspended in epichlorohydrin (preferably: 5-30% w/v solids in ECH, more preferably 10-30% w/v solids in ECH). Thereafter, the suspension can be reacted with a base, such as aqueous solutions of alkali or alkaline earth metal hydroxide. For this purpose, aqueous solutions of NaOH and KOH, particularly preferably 10-50% w/w NaOH in the ratio ECH:NaOH(aq)=1:(0.1-10) have proven suitable. Particularly preferably, the reaction is carried out using a quaternary ammonium salt as phase transfer catalyst.

However, a spacer molecule may alternatively be used in step d.2. It is particularly preferred if a spacer molecule is used at least in the last execution of the coating cycle in step d.2.

It is a preferred feature of the present invention that steps d.1 and d.2, which together are also referred to as a coating cycle, may be repeated. The number of coating cycles may be between 0 and 20, preferably between 0 and 10. However, it is preferred that the number of coating cycles is between 0 and 5, more preferably between 1 and 3.

The hydrophilicity of the polymer carrier material increases with each cycle. By choosing the appropriate number of cycles, the hydrophilicity can be optimally adjusted to the mixture to be separated. In particular, by choosing an appropriate degree of hydrophilicity, hydrophilic interactions of the substrate with strongly hydrated ions (such as fluoride) can be enhanced and interactions with weakly hydrated ions (such as bromate, nitrate, chlorate) can be reduced. This can influence the retention order. Each layer generation also reduces the secondary interactions between polarizable ions such as chlorate or bromate on the one hand and the substrate on the other hand. The tailing of the signal peaks observed due to such secondary interactions decreases significantly, so that even polarizable ions elute symmetrically. The total capacity of the exchange material decreases.

In a preferred embodiment, a spacer molecule, in particular a diepoxide, preferably butanediol diglycidyl ether, is used as the polyfunctional compound in step d.2 in the final execution of the coating cycle d. The advantages of a spacer molecule have been described above in connection with step c. The reaction of a spacer molecule is preferably carried out with the addition of a polar solvent to the reaction mixture, particularly preferably DMSO in a volume ratio of 1:(0.1-5), more preferably in a ratio of 1:(0.5-1.5) relative to diglycidyl ether. Also preferred is the use of a quaternary ammonium salt as phase transfer catalyst, particularly preferably tetrabutylammonium bromide in the concentration range of preferably 1-100 mmol/L, particularly preferably 10-50 mmol/L, based on the total volume of the reaction mixture. Alkali and alkaline earth metal hydroxides and carbonates may be used as the base, preferably aqueous solutions of NaOH and KOH, particularly preferably NaOH in the concentration range of 0.1-5 mol/L, most preferably in the concentration range of 0.1-1 mol/L. The volume ratio relative to the diglycidyl ether is 1:(0.1-5), preferably 1:(0.5-1.5). The preferred reaction temperature is 0-50° C., particularly preferably 20-30° C., with a preferred reaction time of 2-40 h, particularly preferably 15-25 h.

In a preferred embodiment, the ion exchange group is introduced by reacting the compound of step c or d.2 with an organoelement compound of the 5th main group, preferably an amine, particularly preferably a tertiary amine. However, the ion exchange group may comprise a phosphine or arsine instead of the amine. A compound containing an amine having 1 to 3 organic radicals of 1 to 10 C atoms per radical, this also including cyclic compounds, has proved to be particularly suitable. The cyclic compounds may have substituents. Examples of suitable compounds include nitrogen-containing heterocycles, for example pyridines with or without hydrocarbon or hydroxy substituents, singly substituted alkylpyrrolidines, singly substituted alkylpiperidines or doubly substituted alkylpiperazines. The hydrocarbon radicals of the amine compounds may also have heteroatoms, for example oxygen or sulfur atoms, or other substituents.

However, it would also be conceivable to introduce compounds suitable for cation exchange chromatography or HILIC methods. Suitable cationic functional groups include sulfonic acids, carboxylic acids, or combinations thereof. Preferably, the compounds to be introduced may also have multiple functional groups, for example when amino acids are introduced.

For example, to generate a cationic exchange center, the polymer epoxidized in the previous step can be suspended in a mixture of water and a polar solvent, preferably DMSO, and a preferred amine can be added. The preferred reaction time is between 0.5 and 48 h at a preferred temperature of 20-70° C.

It is preferred that step e, the introduction of ion exchange groups, is followed by a further step f comprising heating the polymer support material provided with ion exchange groups in alkaline solution. This allows the selectivity and capacity of the ion exchange material from the previous step to be adjusted. The treatment is hereinafter referred to as elimination and consists in particular in heating the particles provided with exchange groups in aqueous alkaline solution, particularly preferably in heating in an aqueous solution of alkali metal or alkaline earth metal hydroxide or carbonate, for example in sodium hydroxide solution. The preferred concentration of NaOH is in the range of 0.1 to 5 mol/L base, and 0.2 to 2 mol/L base is particularly preferred. The reaction temperature may be 20-100° C., particularly preferred is 90-100° C., with a treatment time of 0.1-150 h, particularly preferred 2-6 h.

The elimination step changes the relative intensity of the interaction of the substrate with individual ions. In particular, secondary interactions with polarizable analytes can be reduced. The tailing of the signal peaks, which is observed due to such secondary interactions, decreases so that polarizable ions also elute symmetrically.

At the same time, the electrostatic interaction capacity of the column is also reduced after elimination and the total capacity of the ion exchange material decreases.

Another aspect of the invention relates to a polymer support material for use as a stationary phase in an analytical or preparative separation process, in particular a chromatographic process, obtainable by a process comprising the steps as described above, at least steps a, b and c.

Another aspect of the invention relates to a polymer support material for use as a stationary phase in an analytical or preparative separation process, in particular a chromatographic process, obtainable by a process comprising the steps as described above, at least steps a and b, preferably at least steps a and b and c, wherein the polymer support material provided in step a is hydrophobic and microporous or mesoporous. By hydrophobic it is understood here that the polymer support material is non-polar, i.e. has no monomer units with a dipole moment >0.2 D. By microporous or mesoporous it is understood here that the polymer support material has an average pore diameter of at most 50 nm.

Another aspect of the invention relates to a modified polymer support material for use as a stationary phase in ion exchange chromatography when the method comprises at least steps a, b, c and e.

A modified polymer support material obtainable in this way is characterized in that differences of at least 20%, preferably differences of at least 50%, and particularly preferably differences of 100%, in each case starting from the value of the maximum O content, are detectable in the cross-section through the polymer support material by means of X-ray photoelectron spectroscopy XPS;

the oxygen-containing groups are covalently bonded to the core polymer support material;

the polymer support material is mechanically stable, so that the pressure drop across a column packed with the polymer support material increases only linearly as a function of an increased flow rate;

the polymer carrier material carries no charge at neutral pH;

the polymer carrier material has a nitrogen content of less than 2%.

In particular, the modified polymer carrier material has a higher oxygen content at the surface than in the core. The modified polymer support material obtained by the process is also largely chemically inert. The polymer support material thus obtained is adjustable in that it may have a more or less oxygen-containing surface. Due to its structure and surface properties, the material is particularly suitable for use as a stationary phase in analytical or preparative separation processes. In particular, the substrate is suitable for further processing into particulate ion exchange material prepared by the method described above, which is also part of the invention. However, the polymeric support material can also be further processed for use in other adsorption chromatography methods, HILIC methods, reversed phase chromatography, solid phase extraction, etc. Thanks to the microporosity or mesoporosity, the modified polymer support material is suitable for the production of a column with a high number of theoretical plates with correspondingly good separation performance, since the microporous and mesoporous particles are mechanically stable even at small diameters and the diffusion paths can thus be set shorter.

Another aspect of the invention relates to a polymer support material modified according to the invention for use as a stationary phase in ion exchange chromatography, obtainable by a process comprising the steps as described above, wherein ion exchange groups are additionally introduced into the polymer support material according to step e.

An ion exchange material obtainable in this way can be characterised in that differences of at least 20%, preferably differences of at least 50%, and particularly preferably differences of 100%, in each case starting from the value of the maximum O content, are detectable in the cross-section through the polymer support material by means of X-ray photoelectron spectroscopy XPS;

the oxygen-containing groups are covalently bonded to the core polymer support material;

the ion exchange material is mechanically stable, so that the pressure drop in a column packed with the polymer support material increases only linearly as a function of an increased flow rate;

the ion exchange material, with the exception of the ion exchange groups introduced, is not based on modifications by means of epoxide-amine reactions, possibly detectable by Hofmann elimination;

optionally, the ion exchange material has a plate number >50,000 TP/m;

optional, selectivity and capacity are additionally adjustable with elimination step f.

In particular, the ion exchange material has a higher oxygen content at the surface than in the core. For example, the surface of a modified polymer carrier material produced according to the process according to the invention up to and including step c has an oxygen content which is 50% higher, preferably 60% higher, based on the value of the maximum O content, than the inner particle regions, detectable by XPS measurements.

It is an advantage of the ion exchange material according to the invention that hydrophilicity and capacity or selectivity and capacity can be configured in individual steps, i.e. independently of each other. The ion exchange material prepared by the method according to the invention shows only weak secondary interactions with polarizable ions and increases the retention time of strongly hydrated ions. A column packed with hydrophilized ion exchange substrate shows the desired selectivity. The material does not swell and shows advantageous properties in stress tests. A particularly efficient column can be packed with the ion exchange material.

The polymer support material as described above is suitable for use as a stationary phase in an ion chromatography process, in particular a chromatography process for the separation of the standard ions fluoride, chloride, nitrite, bromide, nitrate, phosphate and sulfate. A high ion exchange capacity of the column is particularly necessary for the separation of small, singly or doubly charged ions. In contrast, convective or perfusive mass transport of the analyte solution, as achieved by macroporous structures, is not desired. Macroporous structures are also frequently associated with inferior mechanical load-bearing capacity.

The invention further relates to a modified polymeric carrier material as described above, wherein the polymeric carrier material provided in step a is composed substantially entirely of monomer units selected from the group of:

Monomer units derived from aromatic hydrocarbon compounds having at least two vinyl or allyl substituents, preferably derived from divinylbenzene;
  monomer units derived from ethylvinylbenzene;
  monomer units derived from styrene;
  a combination thereof.

By "substantially completely built up" it is understood here that the total proportion of the listed monomer units in the polymer carrier material provided in step a, is at least 95% by weight, preferably at least 98% by weight, particularly preferably at least 99% by weight. In other words, the monomeric units may be derived substantially entirely from compounds that do not contain oxygen atoms, so that a hydrophobic particle core is obtained.

Another aspect of the invention relates to a modified polymer support material as described above, wherein the polymer support material provided in step a has an average pore radius of from 1 to 50 nm, preferably from 2 to 25 nm, more preferably from 2 to 10 nm, measurable by nitrogen sorption in the BJH model. The measurement is carried out as described below in Example 5.

Another aspect of the invention relates to a modified polymeric support material as described above, wherein the polymeric support material provided in step a has a specific surface area of from 80 to $1000^{m2/g}$, preferably from 100 to $800^{m2/g}$, even more preferably from 200 to $600^{m2/g}$, measurable by nitrogen sorption in the BET model. The measurement is performed as described below in Example 5. The high specific surface area increases the capacity and resolving power of the column especially when separating small ions, for example the standard ions.

Another aspect of the invention relates to a modified polymeric support material as described above, wherein the polymeric support material provided in step a has a pressure stability up to 220 bar, preferably up to 250 bar. By pressure stability it is understood here that the pressure increase as a function of the flow rate behaves only linearly. The measurement is carried out as described below in Example 6. The high pressure stability results from the small particle diameter size and the micro/mesoporosity of the particle structure.

Preferably, the modified polymeric carrier material is present as particles, preferably as spherical particles, more preferably as spherical particles having an average particle size (median) of 1 to 50 µm. Particularly preferably, the particles are present in the size range from 2 to 25 µm and very particularly preferably in the size range from 3 to 9 µm. The particle size in this case is the mean value between the longest and the shortest straight line through the centre of the particle, measurable by means of scanning electron microscopy (SEM) and automated image evaluation.

The size of the particles can be adjusted by suitable stirring speed, choice of solvent, concentration of the polymer in the solvent, etc. The methods are known to the skilled person. A carrier polymer of this shape and size has a volume/surface area ratio which has been found to be particularly advantageous for the exchange capacity. It exhibits high diffusivity into the pores and is easily packable.

One aspect of the invention relates to a modified polymer support material as described above, wherein the modified polymer support material is stable in the pH range of 0 to 14. By pH stable it is understood here that the retention time of sulfate in a column packed with modified polymer support material after rinsing with 1 M NaOH solution and/or rinsing with 1 M HCl solution does not deviate more than 8%, preferably not more than 5%, more preferably not more than 3% from the retention time of sulfate in a column packed with modified polymer support material not previously exposed to pH values of 0 and/or 14. The measurement method for pH stability results from embodiment example 8 below.

Another aspect of the invention relates to an ion exchange chromatography column filled with modified polymer support material, preferably particulate modified polymer support material, which is producible by the method according to the invention.

Furthermore, the invention relates to a process for the chromatographic separation of analytes, characterized in that a solution containing the analytes is contacted with a modified polymer support material according to the invention, in particular is passed through an ion exchange chromatography column according to the invention.

The invention then relates to the use of polymer support material obtainable by the process according to the invention for the analytical or preparative separation of analytes, in particular use in anion exchange chromatography, cation exchange chromatography and/or in HILIC chromatography (hydrophilic interaction liquid chromatography).

BRIEF DESCRIPTION OF THE DRAWINGS

To further illustrate the invention, the following exemplary embodiments are described. The exemplary embodiments have no limiting effect on the disclosure content and claim of the invention.

It shows the following figures.

DETAILED DESCRIPTION OF THE PREFERRED EMBODIMENTS

Example 1

Figure 1:
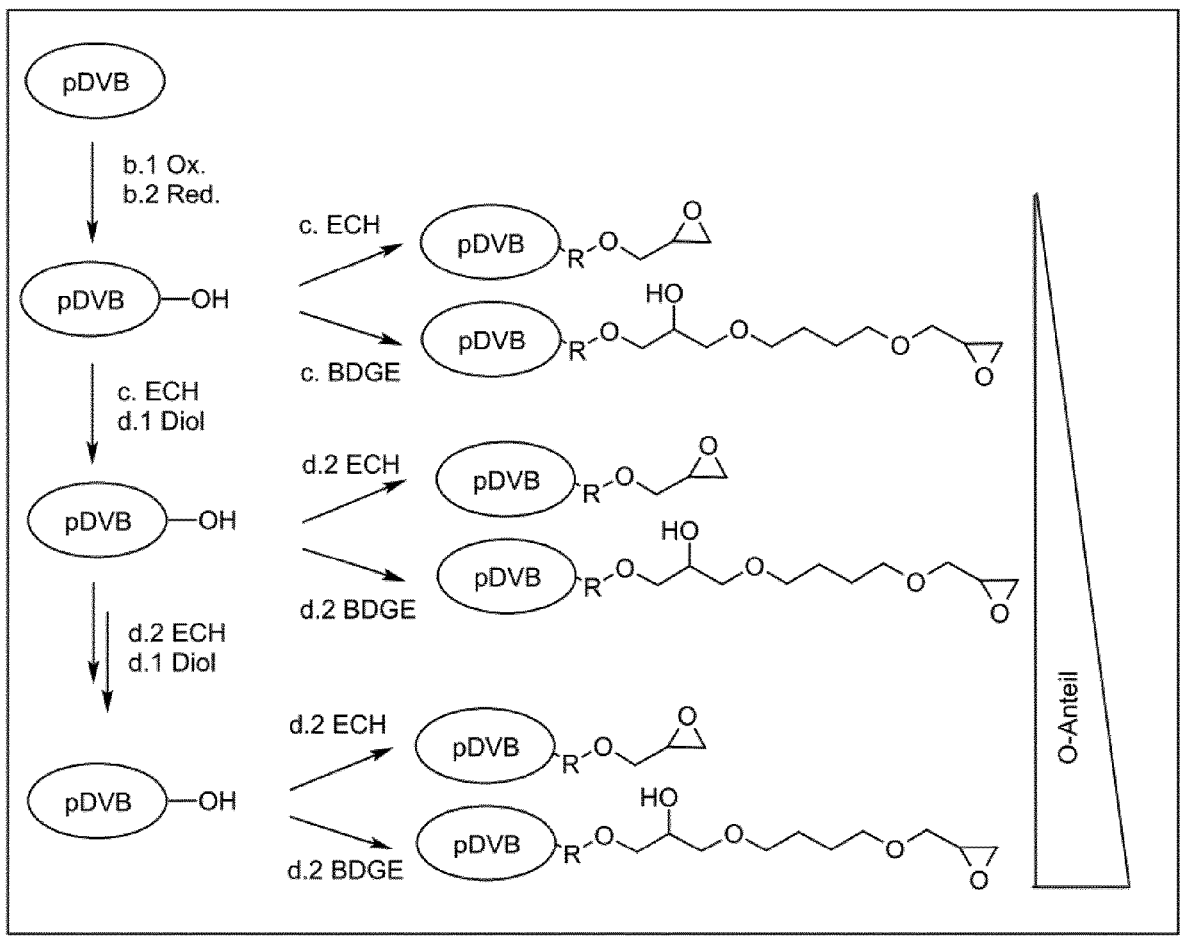
FIG. 1: Schematic representation of exemplary modification sequences on the polymer support material.

All substances used were classified as "pure" or "pa" (with the exception of hydrogen peroxide and formic acid), solvents were separated from low volatile components by distillation on a rotary evaporator.

Oxidation with Potassium Permanganate 10.0 g PS/DVB (55% DVB in EVB) was placed in a 350 mL sulfation flask and suspended with 100 mL acetonitrile. Then 5.0 g KMnO4 dissolved in 100 mL water was added over 20 minutes. The reaction solution was adjusted to an acidic pH with a little acid. The suspension was stirred for 120 h at 25° C. The particles were worked up with semi-concentrated hydrochloric acid followed by washing with ultrapure water. The product was dried in a vacuum drying oven to constant weight. The final weight was 9.7 g.

Reduction with Lithium Aluminium Hydride 8.6 g of the dried, oxidized particles were placed in a 500 mL reactor and mixed with 150 mL THF. Under argon atmosphere and external cooling to 5° C., 1.5 g of lithium aluminium hydride was slowly added and mixed with another 50 mL of THF. The reactor was warmed to room temperature and stirred for 17 h. The reaction was stopped. The reaction was stopped by adding water slowly. This was followed by working up with water/acetone, acidification with dilute sulfuric acid and neutral washing with water. After final washing with acetone, the solid obtained is dried in vacuum drying oven. 8.35 g of particles were obtained.

Reaction with Epichlorhydrin (ECH)

7.6 g of reduced, dried particles are placed in a 250 mL three-neck flask. 35 mL of epichlorohydrin was added and the mixture was evacuated 3 times and aerated with argon. The solution was heated to 45° C. Subsequently, 7 mL of the phase transfer catalyst solution (3 g tetrabutylammonium hydroxide in 10 mL water) was added, further addition of 140 mL sodium hydroxide solution. The reaction was stirred for 3.5 hours and then stopped by addition of water/ethanol. Work-up was performed with water/ethanol or water/acetone. The product was used directly in the next step without drying.

Reaction with Butanediol

The above polymer was then suspended in 70 mL of butanediol together with 1.98 g of KOH at room temperature and then stirred at 130° C. for 18 h. The reaction mixture was then allowed to react for a few minutes. After completion of the reaction time, water was added to the reaction mixture and filtered. The polymer was washed several times with water and acetone. The filter cake was dried in vacuum drying oven overnight. 7 g of polymer was obtained.

Attaching a Spacer 6.6 g of the above polymer was suspended in 16.5 mL DMSO and 16.5 mL butanediol diglycidyl ether and evacuated three times followed by aeration. Then, 1.4 mL of 1M tetrabutylammonium bromide solution and 16.5 mL of 0.6M NaOH (aq) were added and stirred mechanically for 22 h. The reaction was terminated by the addition of a solvent. Reaction was terminated by addition of a 1:1 mixture of water and ethanol. Repeated washing was carried out with a water/ethanol mixture. The product was finally filtered to dryness. The polymer was used directly in the next step.

Introduction of Anion Exchange Groups

The above polymer was then suspended in 45 mL of DMSO without transition and 45 mL of water was subsequently added. The suspension was heated to 70° C. and 45 mL of N-methylpyrrolidine was added. After completion of the reaction time of 2 h, the reaction was stopped by addition of acetic acid. The polymer was filtered off and washed several times with water. The wet polymer was used directly in the next step.

Elimination

The above polymer was suspended in 50 mL of water and 7.5 mL of 40% NaOH (aq) was added. The suspension was then stirred for 4 h at 100° C. The reaction was stopped by filtration. The filter cake was washed several times with ultrapure water and then packed into a 4×100 mm PEEK column according to known high pressure packing procedures.

Example 2

Oxidation with Low Pressure Oxygen Plasma 40 g PS/DVB (55% DVB in EVB) were oxidized in a plasma powder plant using oxygen plasma. The particles can be further processed directly after treatment.

Reduction with Lithium Aluminium Hydride (LAH)

30 g of the oxidized, dried polymer was suspended in 250 mL of dry diethyl ether in a 1000 mL reactor with pressure equalization. Tempering to 25° C., 6 g of lithium aluminum hydride was slowly added under argon atmosphere, heated to 30° C. for 6 h with stirring, and stirred for another 20 h at room temperature. Reaction stopped by cooling the reaction mixture to 0° C. and slowly adding 15 mL of ethyl acetate. Work-up was carried out with water, diluted sulfuric acid, water, 5 w % NaOH solution, ultrapure water and diluted hydrochloric acid.

The polymer was washed neutrally with ultrapure water and filtered dry with acetone. The product was dried in a vacuum drying oven. 30 g of polymer was obtained.

Reaction with Epichlorohydrin 5.0 g of reduced, dried particles were placed in a 250 mL three-neck flask and 25 mL of epichlorohydrin was added. The suspension was evacuated 3 times and aerated with argon. Subsequently, 1.75 mL of the 1 M phase transfer catalyst solution (tetrabutylammonium bromide in water) and 25 mL of 30% sodium hydroxide solution were added, heated to 45° C. and stirred for 3.5 hours. The reaction was terminated by addition of water/ethanol. Purification of the product was done by washing several times with water/ethanol or water/acetone. The product was used directly in the next step without drying.

Reaction with Butanediol

The above polymer was then suspended in 50 mL of butanediol with 1.3 g KOH at room temperature and heated to 130° C. for 18 h. The reaction mixture was then allowed to settle. After completion of the reaction time, 200 mL of water was added to the reaction mixture and filtered.

The filter cake was washed with water and acetone. The product was dried in vacuum drying oven and 4.2 g of dry product was obtained.

Attaching a Spacer 3.8 g of the above polymer was suspended in 10 mL of DMSO and 10 mL of butanediol diglycidyl ether and subjected to pressure cycling three times, refilling the reaction vessel with argon. Then, 0.8 mL of 1 M tetrabutylammonium bromide solution and 10 mL of 0.6M NaOH (aq) were added and stirred for 22 h. The reaction mixture was then subjected to three pressure changes. Subsequently, 200 mL of a 1:1 mixture of water and ethanol was added to the reaction mixture and filtered. This washing procedure was repeated several times, the product filtered to dryness and used directly in the next step.

Introduction of Ion Exchange Groups

The above polymer was suspended in 30 mL of DMSO, 30 mL of water was added and the suspension was heated to 70° C. After reaching the reaction temperature, 30 mL of N-methylpyrrolidine was added and stirred for 2 h at 70° C. After completion of the reaction time, 60 mL of concentrated acetic acid was added and the product was filtered off. The filter cake was washed with water neutral and used in the elimination.

Elimination

The above polymer was suspended in 100 mL of water, mixed with 20 mL of 30% NaOH (aq) and stirred for 28 h at 100° C. After completion of the reaction time, the reaction was stopped by addition of hydrochloric acid, the suspension was filtered, the filter cake was washed several times with water neutral and then packed into a 4×100 mm PEEK column according to known high pressure packing procedures.

Example 3

Oxidation with Meta-Chloroperbenzoic Acid 20 g PS/DVB (55% DVB in EVB) was placed in a 250 mL glass bottle with a threaded lid and suspended with 93 g dichloromethane. Then, 5.5 g of meta-chloroperbenzoic acid was added as a solid and the reaction mixture was mixed at room temperature for 18 h on a shaker. The product was washed several times with ethanol and water and dried in a vacuum drying oven to weight consistency. The final weight was 19.0 g.

Hydrolysis with Hydrochloric Acid 19 g of the oxidized, dried polymer was placed in a 250 mL glass bottle with a threaded lid and suspended with 52 g of acetone and 13 g of hydrochloric acid 37%. The reaction mixture was mixed at 40° C. on a circulating air heating shaker for 21 h. The mixture was then removed from the bottle. The product was washed with water neutral, then washed several times with water and acetone and dried in a vacuum drying oven to constant weight. The final weight was 18.5 g.

Reaction with Epichlorohydrin 11.8 g of the hydrolyzed, dried polymer was suspended in a 250 mL three-neck flask containing 60 mL of epichlorohydrin. The reaction vessel was subjected to three vacuum/argon cycles. The reaction mixture was heated to 45° C. with stirring and then 3 mL of 1 M (aq) tetrabutylammonium bromide solution was added. Subsequently, 60 mL of 30% (aq) sodium hydroxide solution was added and stirred vigorously. After 22 h of reaction, the reaction mixture was diluted with 200 mL of water and 200 mL of ethanol, and then the polymer was filtered off. The polymer was washed with acetone, water and then acetone again.

Reaction with Butanediol 5 g of the above product was suspended in a 100 mL three-neck flask with 1.4 g of potassium hydroxide and 50 mL of 1,4-butanediol and mixed for 19 h at 130° C. Subsequently, the reaction mixture was cooled and mixed with 45 mL of water. The product was filtered off and washed with water to neutrality, then dried to weight consistency in a vacuum drying oven. The final weight was 4.0 g.

Reaction with 1,4-Butanediol Diglycidyl Ether 3.1 g of the above product was suspended in a 100 mL three-neck flask containing 8 mL of dimethyl sulfoxide and 8 mL of 1,4-butanediol diglycidyl ether. The reaction vessel was subjected to three vacuum/Argon cycles. With stirring, 0.8 mL of 1 M (aq) tetrabutylammonium bromide solution and 8 mL of 0.6 M sodium hydroxide solution were added to the reaction. After 22 h of reaction, 25 mL of water and 25 mL of ethanol were added to the reaction mixture and then filtered off. The product was washed once with water and ethanol.

Introduction of Ion Exchange Groups

The above product were suspended in a 100 mL three-neck flask with 15 mL of dimethyl sulfoxide, 15 mL of water and 15 mL of N-methylpyrrolidine. The reaction mixture was stirred at 70° C. for one hour, then cooled and 30 mL of acetic acid was added. The polymer was filtered off and washed with water.

Elimination

The above product was suspended in 50 mL of water and 7.5 mL of 40% (aq) sodium hydroxide solution in a 100 mL round bottom flask and heated to 100° C. After 4 h of reaction, the reaction mixture was cooled and filtered off. The product was washed twice with water and then packed into a 4×100 mm PEEK column according to known high pressure packing procedures.

Example 4

Oxidation with Formic Acid 25.0 g PS/DVB (55% DVB in EVB) was suspended in 188 mL formic acid in a 500 mL 3-neck flask with pressure equalization. 54 mL of 35% hydrogen peroxide was added slowly via a dropping funnel and the reaction solution was cooled externally. After the heat of reaction had dissipated, stirring was carried out for 65 h at room temperature. After completion of the reaction second, the reaction mixture was washed acid-free with ultrapure water and then dried in a vacuum drying oven at to constant weight. The final weight was 27.78 g.

Reduction with Lithium Aluminium Hydride 27.64 g of the oxidized, dried polymer was suspended in 270 mL of dry diethyl ether in a 500 mL pressurized 3-neck flask, cooled to 0° C. with an ice bath, and 8.8 g of lithium aluminum hydride was carefully added with stirring. After addition was complete, the ice bath was removed and the reaction mixture was refluxed with stirring for 10 h and stirred for another 24 h at room temperature. Reaction was terminated by external cooling and addition of diethyl ether, ethyl acetate and ultrapure water.

After reaction of the remaining hydride, the reaction mixture was placed on ice and dilute chilled sulfuric acid was added with stirring. The reaction mixture was washed with the following solutions: Water, 5% NaOH solution, water, dilute acetic acid, water and acetone. The filter cake was filtered to dryness and dried in a drying oven. The yield was 26.20 g.

Reaction with Epichlorohydrin 4.00 g of the polymer was suspended in 20 mL each of ECH and DMSO, sonicated for 15 min in an ultrasonic bath, and then subjected to two pressure changes, refilling the reaction vessel with argon. After addition of 4.30 mL of 25% tetramethylammonium hydroxide solution in water, stirring was carried out for 2 h at room temperature. The reaction mixture was filtered and washed with a 1:1 mixture of water and 2-propanol and acetone. The filter cake was filtered to dryness.

Reaction with Butanediol

The above polymer was then suspended in 40 mL of butanediol together with 1.12 g of KOH at room temperature and then stirred at 120° C. for 20 h. The reaction mixture was washed several times with water and acetone. After completion of the reaction time, the reaction mixture was washed several times with water and acetone. The product was filtered to dryness. The wet mass was 13.36 g.

Coating Cycle: Reaction with Epichlorohydrin (ECH)

The still wet polymer from the above step was made up to 13.50 g with water and 1 mL of 1 M tetrabutylammonium bromide and 20 mL of ECH were added. Subsequently, 10.5 mL of 50% NaOH (aq) was added and stirred for 5.5 h. The reaction mixture was then washed with a 1:1 mixture of water and 2-propanol, and acetone. The filter cake was filtered to dryness.

Coating Cycle: Reaction with Butanediol

The above polymer was suspended in 40 mL of butanediol together with 1.12 g of KOH at room temperature and then stirred at 120° C. for 18 h. The reaction mixture was washed several times with water and acetone. After completion of the reaction time, the reaction mixture was washed several times with water and acetone. The product was filtered to dryness. The polymer was dried last before further reaction. The yield was 5.66 g.

Attaching a Spacer 2.30 g of the above polymer was suspended in 6 mL of DMSO and 6 mL of butanediol diglycidyl ether and subjected to pressure cycling three times, refilling the reaction vessel with argon. With stirring, 0.5 mL of 1M tetrabutylammonium bromide solution and 6 mL of 0.6M NaOH (aq) were added and stirred for 22 h. The reaction mixture was then subjected to three pressure changes. The reaction mixture was then washed with a 1:1 mixture of water and 2-propanol and filtered to dryness.

Introduction of Anion Exchange Groups

The above polymer was suspended in 5 mL DMSO and mixed with 5 mL water and 5 mL N-methylpyrrolidine. Subsequently, the reaction mixture was stirred for 1 h at 70° C. The reaction was stopped by adding water and diluted acetic acid. The filter cake was then washed with dilute hydrochloric acid, water and acetone. The polymer obtained was dried at 60° C. in a drying oven. The yield was 2.54 g.

Elimination

The above polymer was suspended in 50 mL of water, added with 5 mL of 30% NaOH (aq) and stirred for 2 h at 100° C. Reaction was terminated by filtration followed by washing with water, dilute HCl, water and acetone. The filter cake was filtered to dryness and the polymer was subsequently dried at 60° C. in a drying oven. No significant weight loss was observed.

FIG. 1 shows schematically different, exemplary modification sequences on the core polymer carrier material (pDVB). After initial oxidation (b.1) and subsequent reduction (alternatively: subsequent hydrolysis, b.2), a polymer carrier material is available which has hydroxy groups on the surface (pDVB-OH). The polymer support material having OH groups (pDVB-OH) can then be reacted with epichlorohydrin (ECH). This results in a compound according to step c. The polymeric support material comprising OH groups (pDVB-OH) can alternatively be reacted with butanediol diglycidyl ether (BDGE) in step c.

According to the invention, the polymer support material can be reacted after step b.2 in one or more coating cycles with ECH, a diol and subsequently again with ECH or BDGE (steps c, d.1, d.2). The polymer support material can also be reacted directly with BDGE after step b.2, for example. The result is a modified polymer support material having suitable reactive functional groups on the surface. In the example shown, these are epoxy groups.

In principle, any combination of ECH/BDGE modifications in steps c and d.2, respectively, and also any combination of diol conversions/hydrolysis in step d.1 are conceivable. However, as described above, it is preferred if a spacer molecule is inserted during the last coating cycle in d.2.

The modified polymer support material shown in FIG. 1 is suitable for the subsequent introduction of ion exchange groups. The oxygen content at the surface of the modified polymer support material increases in the order of the variants listed in the previous section (variants from top to bottom in the figure). When ion exchange groups are introduced into each of the products, the result is an ion exchange material whose hydrophilicity increases in the order of the listed variants. The increased hydrophilicity manifests itself, for example, in reduced selectivity $\sigma$ from NO3 to Cl.

FIGS. 2 to 6 are intended to illustrate the process steps according to the invention and show the reaction sequences in a highly simplified form. They do not claim to be complete. The focus is on the respective modification on the polymer support material surface. The portion of the polymer carrier material not modified in the respective step is shown in simplified form as a spherical particle.

Figure 2:
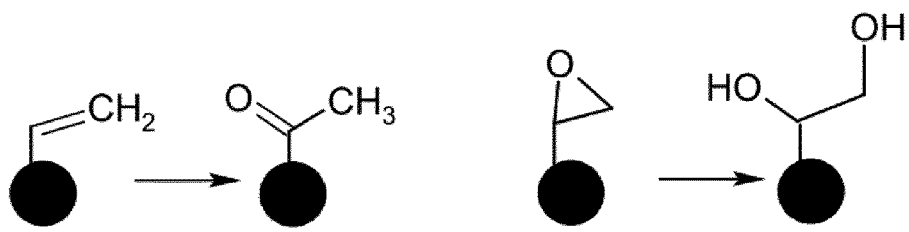
FIG. 2: Schematic representation of the modification steps b.1 and b.2.

FIG. 2 schematically shows modification steps b.1 and b.2. After oxidation and reduction (alternatively: hydrolysis), a polymer carrier material with OH groups on the surface is provided. It is known to the skilled person that not only ketones can be formed in the oxidation step. Depending on the treatment and in particular during the treatment with KMnO4, besides ketones also diols, diketones or, as a cleavage product, dicarboxylic acids may be formed. Such processes and intermediates are covered by the claimed process and are not intended to be excluded by the examples shown in the figures.

Figure 3:
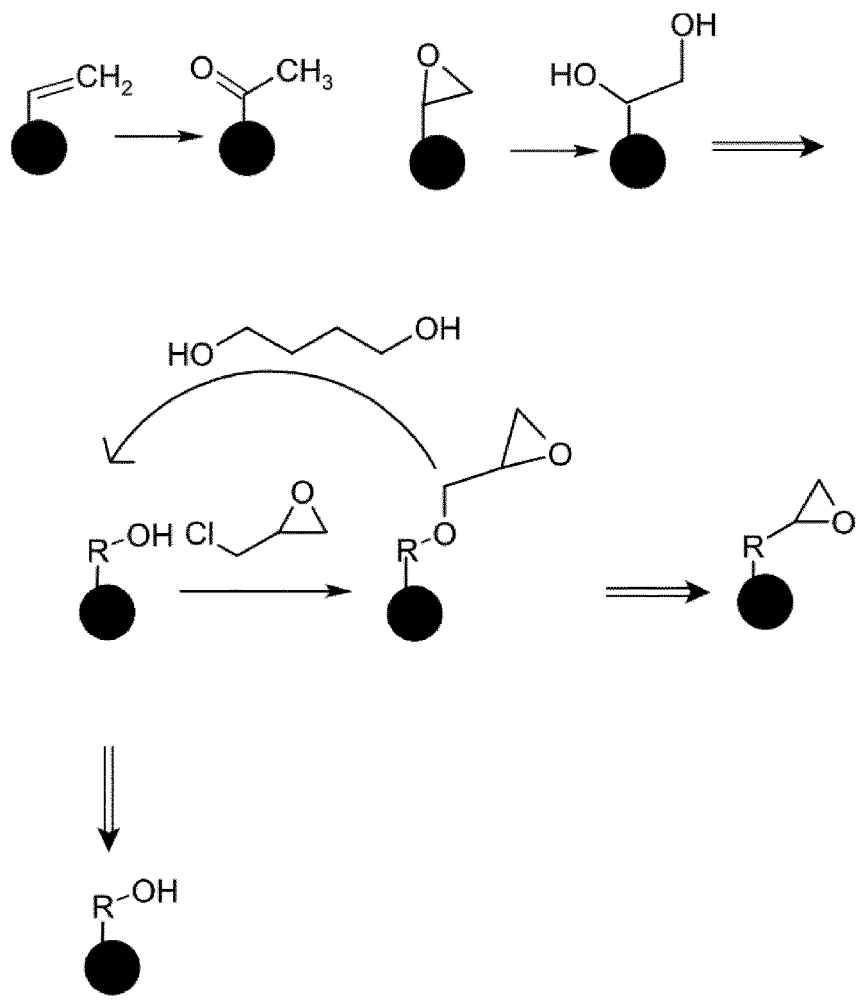
FIG. 3: Schematic illustration of modification steps b.1 and b.2 followed by exemplary modification steps c and d.1.

FIG. 3 schematically shows modification steps b.1 and b.2, followed by exemplary modification steps c and d.1. In the variant shown, the compound used in step c, having at least one first functional group reactive with hydroxy groups and at least one second functional group reactive with amines and/or hydroxy groups, is epichlorohydrin. In the embodiment shown, the polyfunctional compound comprising hydroxy groups used in step d.1 is butanediol. The coating sequence consisting of alternating reaction with epichlorohydrin and butanediol may be repeated as d.1 and d.2. The resulting particles are again shown abstracted after the double arrow.

Figure 4:
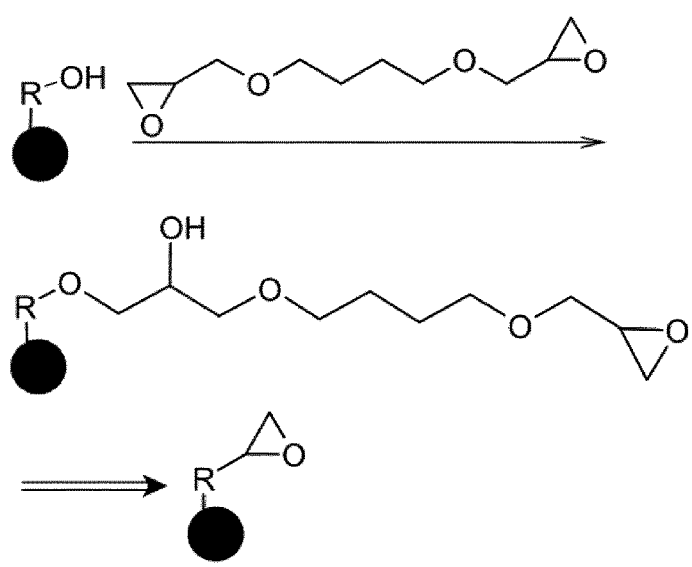
FIG. 4: Schematic representation of an alternative modification step c or d.2.

FIG. 4 schematically shows an alternative modification step c or d.2. The compound used in step c or d.2, having at least one first functional group reactive with hydroxy groups and at least one second functional group reactive with ion-exchange groups and/or hydroxy groups, is BDGE.

Figure 5:
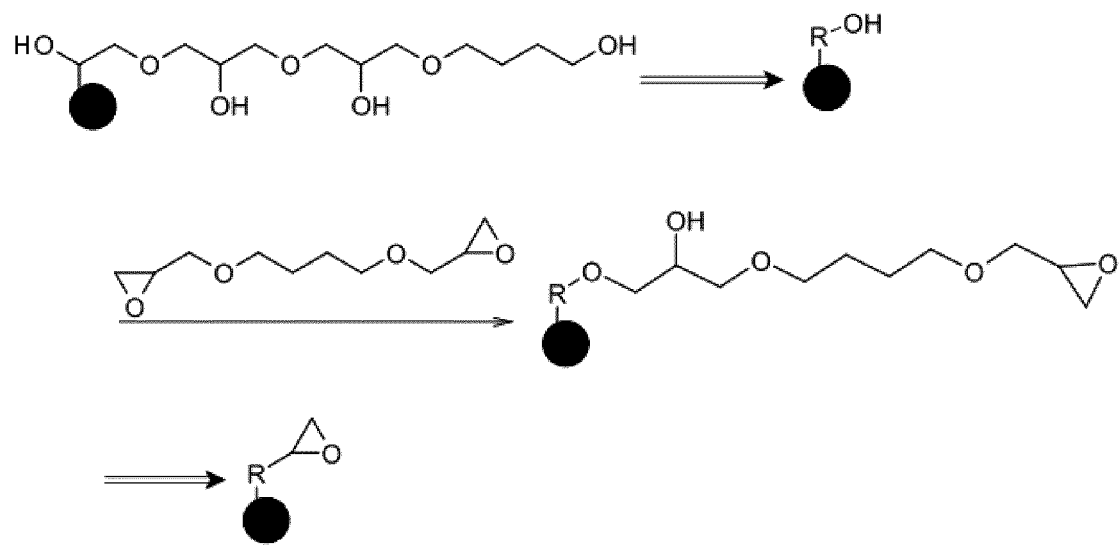
FIG. 5: Schematic representation of the result of a modification step d.1 followed by a reaction with BDGE (butanediol diglycidyl ether)

The conversion with BDGE can also complete one or more coating cycles as shown in FIG. 3. FIG. 5 shows schematically and exemplarily the result of a modification step d.1. After using ECH in step c, coating cycles were carried out using ECH in step d.2. After reaction with butanediol, the last step d.2 is then carried out using BDGE as spacer. The result is a modified polymeric support material with a surface oxygen content which is ceteris paribus higher than in the support materials resulting from the schemes FIG. 3/FIG. 4.

Figure 6:
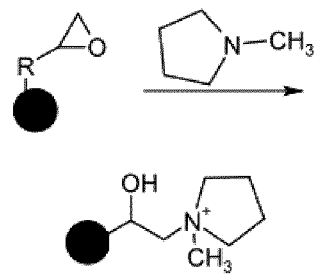
FIG. 6: Schematic representation of an example of a modification step e following step c or d.2, introduction of an ion exchange group.

FIG. 6 schematically shows an example of a modification step e following step c or d.2, the introduction of an ion exchange group. In the example shown, the ion exchange group is formed by quaternization of the 1-methyl-pyrrolidine. After carrying out a modification according to the invention, a polymer carrier material results which has side chains on the surface such as those shown in the example.

Figure 7:
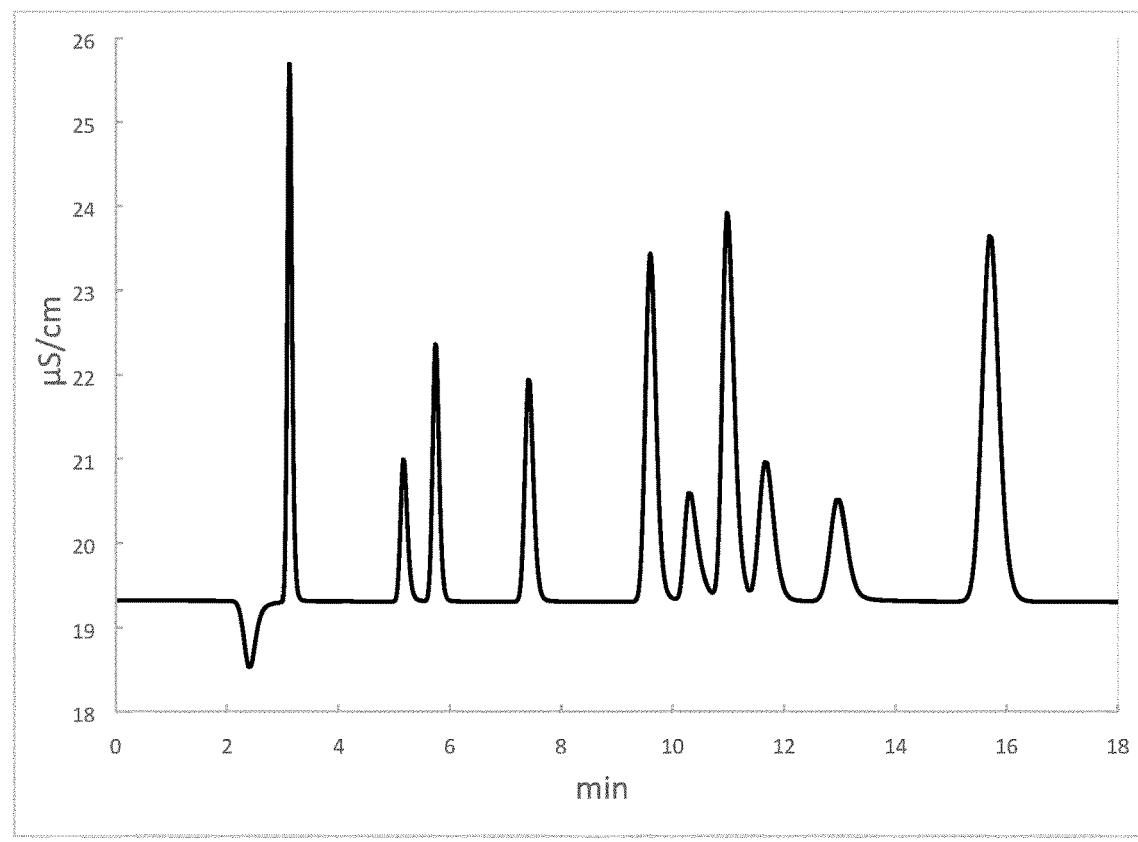
FIG. 7: A chromatogram obtainable with a chromatography column according to embodiment 1 or 4.

FIG. 7 shows a chromatogram obtainable with a chromatography column according to Example 1 or 4. The x-axis shows the running time in minutes. The y-axis shows the conductivity in μS/cm. The dried substrate was packed into a 150×4 mm column for this purpose. The eluent used was 6.0 mmol/L Na2CO3 and 1.0 mmol/L NaHCO3. The analytes of the standard solution are present baseline separated from each other, with the elution order from left to right being fluoride, bromate, chloride, nitrite, bromide, chlorate, nitrate, azide, phosphate, sulfate. Bromate is quantifiably present before chloride (peaks at 5.2, 5.7 min run time) and the chromatogram gives high signal symmetries. The total run time of the column is short at 15 min. Chromatography columns prepared under the conditions of Example 1 provide a comparable chromatogram.

Figure 8:
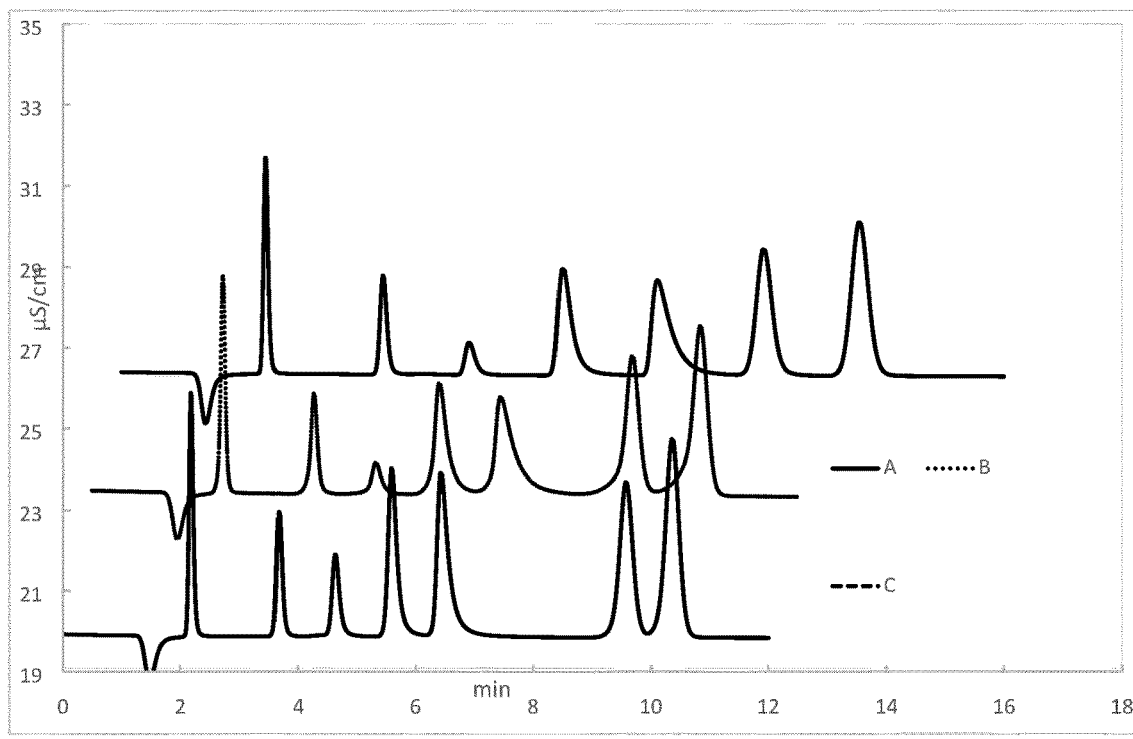
FIG. 8: Chromatograms obtainable with chromatography columns according to embodiment example 1 or 4 with increasing number of repetitions of modification step d.

FIG. 8 shows three chromatograms obtained with a chromatography column according to Example 4. Example 1 provides very similar chromatograms. The x-axis shows the run time in minutes. The y-axis shows the conductivity in μS/cm. The curves show chromatograms of an identical standard solution, where the elution order from left to right is fluoride, chloride, nitrite, bromide, nitrate, phosphate and sulfate. Increased (from top to bottom) was the number of repetitions of modification steps d.1/d.2. For plotted curve A, the step sequence d.1/d.2 was performed once. For the dotted curve B, the step sequence d.1/d.2 was executed twice. For the dashed curve C, the step sequence d.1/d.2 was executed three times. Thus, specifically, in the case of the drawn curve A, a polymer substrate was used which underwent oxidative/reductive treatment, was treated once with ECH and then once with 1,4-butanediol, and was subsequently reacted with BDGE. In curve B, a polymer substrate was used which was subjected to oxidative/reductive treatment, treated with ECH and then with 1,4-butanediol, then treated again with ECH and then with 1,4-butanediol, and then reacted with BDGE. Curve C shows a polymer substrate that underwent oxidative/reductive treatment. Thereafter, the following sequence of steps occurred: reaction with ECH; 1,4-butanediol; ECH; 1,4-butanediol; ECH; 1,4-butanediol; BDGE. In all three cases, the modified substrate was subsequently reacted with methylpyrrolidine. It is evident from the chromatograms that the signals of the anions affected by tailing (nitrite, bromide, nitrate) gain symmetry with increasing number of coating cycles. The selectivity σ of NO3 to Cl decreases with increasing number of plating cycles. The total capacity decreases.

Figure 9:
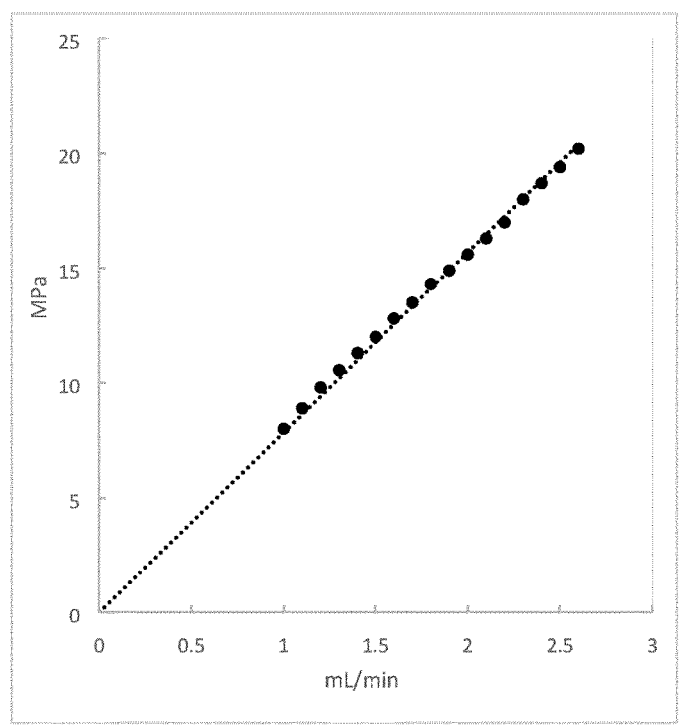
FIG. 9: Pressure-flow profile measured on a chromatography column according to the invention.

FIG. 9 shows a pressure-flow profile measured on a chromatography column according to the invention, prepared according to Example 4, measured at room temperature. The y-axis shows the system pressure in MPa. The x-axis shows the flow rate in mL/min. Seventeen intervals of 20 minutes each were measured while gradually increasing the flow rate from 1 mL/min to 2.6 mL/min. The pressure depends linearly on the flow rate. This is in contrast to results obtained with conventional columns packed with hydrophilic pDVB substrate. With conventional columns, the pressure increases more than linearly as a function of flow rate. For example, a hyperbolic slope of the function may result.

Figure 10:
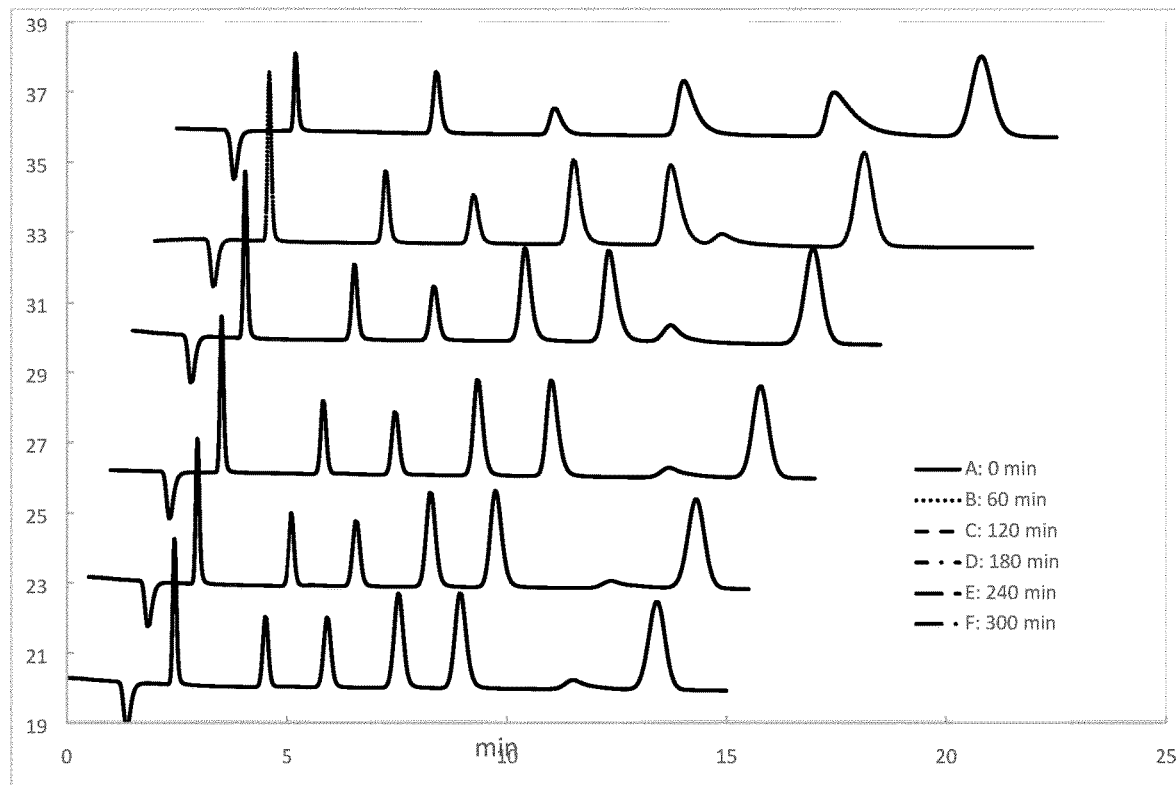
FIG. 10: Chromatograms obtainable with chromatography columns according to embodiment example 1 or 4 with increasing duration of step f.

FIG. 10 shows chromatograms obtainable with chromatography columns according to the invention, in particular with chromatography columns filled with modified polymer support material according to Example 1 or 4. The x-axis shows the running time in minutes. The y-axis shows the conductivity in μS/cm. The duration of step f was varied. The dried substrate was packed into a 100×4 mm column. In each case, the curves show the chromatogram of an identical standard solution, where the elution order from left to right is fluoride, chloride, nitrite, bromide, nitrate, phosphate, and sulfate. From top to bottom, the curves show the chromatograms available after elimination of the column substrate in step f during 0 min (A), 60 min (B), 120 min (C), 180 min (D), 240 min (E) and 300 min (F). When step f is omitted (0 min), the nitrate peak and the phosphate peak overlap. The total capacity decreases with longer elimination time. The analytes are present baseline separated from each other and the chromatogram provides high signal symmetries. The total run time of the column is short with approx. 14 to 20 minutes.

Example 5: Determination of the Average Pore Radius and Specific Surface Area of the Polymer Support Material Provided in Step a In Example 1, a modification according to the invention is carried out on a PS/DVB (55% DVB in EVB). The provided starting polymer support material is thereby both hydrophobic and microporous or mesoporous. The provided starting polymer support material is obtained as follows:

Preparation of a polystyrene seed particle in a dispersion polymerization of styrene in ethanol stabilized with polyvinylpyrrolidone and initiated with azobisisobutyronitrile. A polystyrene particle with 1.5 μm diameter and $_{MN=15}$ kg/mol, $_{MW=55}$ kg/mol is obtained. Swelling of the obtained polystyrene particle in an emulsion of 55% divinylbenzene (DVB)/45% ethylvinylbenzene (EVB) and toluene in water/isoamyl alcohol, stabilized with polyvinyl alcohol and subsequent polymerization initiated by azobisisobutyronitrile. A porous, highly cross-linked poly(DVB-co-EVB) particle with 5 μm radius and a porosity of 1 cm3/g is obtained.

The average pore radius of the starting polymer support material was determined by nitrogen sorption in the BJH (Barret, Joyner, Halenda) model. The specific surface area was determined by nitrogen sorption in the BET model (Brunauer, Emmett, Teller). A sample of 0.0945 g PS/DVB polymer support material was used for both analyses. The density of the sample material was 1.05 g/cc. The measurement was performed on an Autosorb iQ S/N:14713051301 instrument in a 9 mm cell. The bath temperature was 77.35 K. The final outgassing temperature was 60° C. The measurement was evaluated on Quantachrome ASiQwin version 3.01. The measurement was performed twice, once with a soak time of 80 min, once with a soak time of 40 min. The outgassing rate was 1.0° C./min and 20.0° C./min, respectively. The mean pore radius resulting from the BJH method based on the pore volume was 5.060 nm. The specific surface area according to the Multi-Point BET Plot was calculated to be 815.0 $m^2/g$.

Example 6: Determination of the Compressive Stability of the Polymer Support Material According to Step b.2

Figure 11:
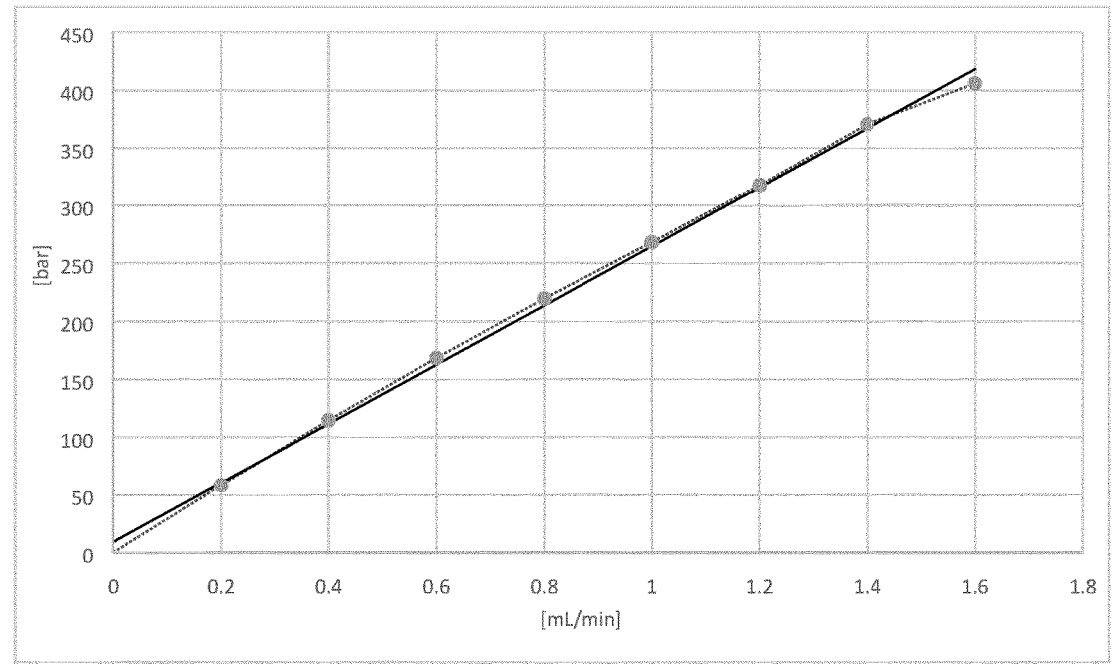
FIG. 11: Pressure-flow profile measured on a chromatography column filled with polymer support material according to the invention from process step b.2.

In Example 4, a modification according to the invention is carried out on a PS/DVB (55% DVB in EVB). The provided starting polymer support material is obtained as described in Example 5. Oxidation with hydrogen peroxide and reduction with lithium aluminum hydride are performed on the starting polymer support material, both as described in Example 4, according to the result of step b.2. The resulting particle was subjected to a compression test. For the pressure test, a 250×4 mm column was packed with the resulting particle and water was passed through the column at an increasing flow rate. FIG. 11 shows a pressure-flow profile measured at room temperature. The y-axis shows the system pressure in bar. The x-axis shows the flow rate in mL/min. Eight intervals of 30 seconds each were measured with a stepwise increase of the flow rate from 0.2 mL/min to 1.6 mL/min. As can be seen from the figure, the pressure depends linearly on the flow rate up to pressures of 400 bar or 40 MPa.

Example 7: Determination of the Average Particle Size

Figure 12:
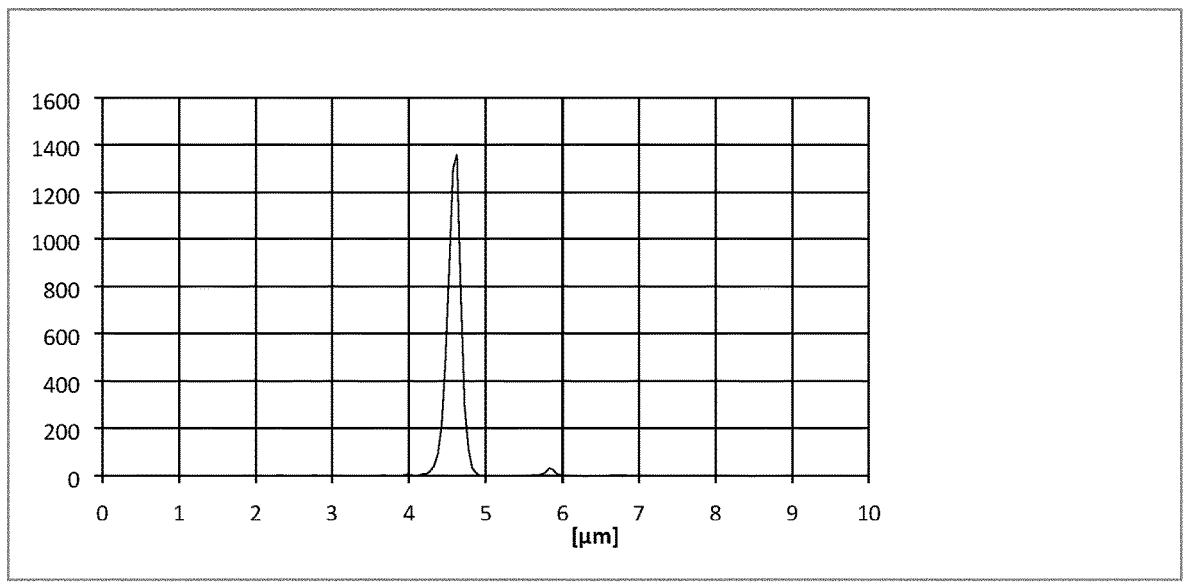
FIG. 12: Result of particle size analysis by SEM (number over diameter [μm]).

The circularity and average particle diameter were determined for a sample of the starting polymer support material provided in step a. The sample was sputtered onto a scanning electron microscope slide in a single particle layer. For this purpose, the sample was deposited on a scanning electron microscope slide in a single particle layer and coated with gold using a LOT AutomaticSputterCoater MSC1 sputter coater connected to a Vacubrand RZ 6 vacuum pump. A series of 27 images were acquired using a scanning electron microscope (Phenom ProX) and the individual particles were identified and measured using Olympus Imaging Solutions Scandium. The identified particles were analyzed for spherical diameter and roundness. All images were analyzed in batch processing using the same thresholds and measurement settings. A total of 6039 particles were measured and their circularity was always ≥0.8. The measurement results are shown in FIG. 12. It shows the y-axis the number of particles and x-axis the diameter in μm. The smallest measured radii were 0.8 μm, the largest up to 10 μm. The mean diameter (median) was 4.59 μm, with a relative standard deviation of 6.23%. The poly-dispersity index PDI (Mw/Mn) was 1.044.

Example 8: Determination of pH Stability

The pH stability was determined for a sample of particulate polymeric support material according to application example 5, modified according to Example 4, i.e. corresponding to a polymeric material obtainable according to steps a to f. For this purpose, the sample was packed into a chromatography column (250×4 mm) and the retention time of sulfate was determined from ten measurements with an eluent of 6 mmol/L Na2CO3 and 1 mmol/L NaHCO3. Subsequently, the column was flushed for 14 h with an eluent of 6 mmol/L Na2CO3 and 1 mol/L NaOH (pH 14) at 0.8 mL/min. Then, 10 measurements of sulfate retention time were again performed with an eluent of 6 mmol/L Na2CO3 and 1 mmol/L NaHCO3. Subsequently, the column was rinsed for 14 h with an eluent consisting of 6 mmol/L Na2CO3 and 1 mol/L HNO3 (pH 0) at 0.8 mL/min. Then, 10 measurements of sulfate retention time were again performed with an eluent of 6 mmol/L Na2CO3 and 1 mmol/L NaHCO3. At each eluent change, rinsing with water was performed for 1 h to avoid precipitation. A possible change was investigated on the basis of the retention time and plate numbers of sulfate; both parameters deviated by a maximum of 3% from those originally determined after both basic and acidic treatment.

The invention claimed is:

1. A method of modifying a polymeric support material for use as a stationary phase in an analytical or preparative separation process, the method comprising the steps of:
   a. providing a polymeric carrier material at least partially formed from aromatic hydrocarbon compounds having at least two vinyl or allyl substituents;
   b. generating hydroxy groups on/in the polymeric support material by a process comprising the steps of
      b.1 oxidative treatment of the polymer carrier material, and subsequently
      b.2 reductive or hydrolytic treatment of the reaction product of step b.1;
   c. reacting the product of step b.2. with a polyfunctional compound comprising
      at least a first functional group reactive with hydroxy groups, and
      at least one second functional group reactive with at least one of amines and hydroxy groups.

2. The method of claim 1, wherein step c is followed by step:
   d. Carrying out a number of coating cycles comprising the steps of:
      d.1 introducing or generating hydroxy groups by reaction of the second functional group, introduced in step c, by
         reaction with a polyfunctional compound having hydroxy groups, or
         hydrolysis, or
         a combination thereof;
      d.2 Reaction of the product of step d.1. with a polyfunctional compound comprising:
         at least a first functional group reactive with hydroxy groups, and
         at least one second functional group reactive with at least one of amines and hydroxy groups;
   where the number of coating cycles is between 0 and 20.

3. The method of claim 1, additionally comprising the step:
   e. introduction of ion exchange groups on the reaction product from step c.

4. The method according to claim 1, wherein the polymeric carrier material in step a, which is formed at least in part from aromatic hydrocarbon compounds having at least two vinyl or allyl substituents, is additionally formed in part from monomers selected from the group consisting of:

ethylvinylbenzene,
vinyl acetate,
styrene, and
a combination thereof.

5. The method according to claim 1, wherein the oxidative treatment in step b.1 is a treatment with a peracid, a treatment with $KMnO_4$, a treatment with oxygen plasma or a combination thereof.

6. The method according to claim 1, wherein the compound used in step c, comprising at least one first functional group reactive with hydroxy groups and at least one second functional group reactive with at least one of amines and hydroxy groups, is an epihalohydrin.

7. The method according to claim 1, wherein the polyfunctional compound used in step c, comprising at least one first functional group reactive with hydroxy groups and at least one second functional group reactive with at least one of amines and hydroxy groups, is a spacer molecule.

8. The method according to claim 2, wherein the polyfunctional compound used in step d.2, comprising at least one first functional group reactive with hydroxy groups and at least one second functional group reactive with at least one of amines and hydroxy groups, is an epihalohydrin or a spacer molecule.

9. The method according to claim 2, wherein the number of coating cycles is between 0 and 10.

10. The method according to claim 2, wherein the ion exchange group is introduced by reacting the compound of step c or d.2 with an organoelement compound of the 5th main group.

* * * * *